(12) United States Patent
Murata (10) Patent No.: US 8,437,039 B2
(45) Date of Patent: May 7, 2013

(54) IMAGE PROCESSING DEVICE, IMAGE PROCESSING METHOD, AND PROGRAM

(75) Inventor: Masahiro Murata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 537 days.

(21) Appl. No.: 12/730,085

(22) Filed: Mar. 23, 2010

(65) Prior Publication Data

US 2010/0245867 A1 Sep. 30, 2010

(30) Foreign Application Priority Data

Mar. 26, 2009 (JP) ................................. 2009-075823

(51) Int. Cl.
*G06F 15/00* (2006.01)
*H04N 1/40* (2006.01)
*H04N 1/46* (2006.01)

(52) U.S. Cl.
USPC ............................ 358/1.9; 358/3.23; 358/502

(58) Field of Classification Search .................. 382/162; 358/1.9, 448, 1.18, 116, 500, 501, 505, 515, 358/530, 502, 3.23
See application file for complete search history.

(56) References Cited

U.S. PATENT DOCUMENTS

| 7,286,263 | B2 | 10/2007 | Ogasawara et al. | |
|---|---|---|---|---|
| 7,652,789 | B2 * | 1/2010 | Berns et al. | 358/1.9 |
| 7,961,352 | B2 * | 6/2011 | Kaneko et al. | 358/1.9 |
| 8,270,029 | B2 * | 9/2012 | Gil et al. | 358/1.9 |
| 2005/0094169 | A1 * | 5/2005 | Berns et al. | 358/1.9 |
| 2005/0094871 | A1 * | 5/2005 | Berns et al. | 382/162 |
| 2008/0130023 | A1 * | 6/2008 | Perez et al. | 358/1.9 |
| 2008/0151276 | A1 | 6/2008 | Mori | |
| 2008/0246982 | A1 * | 10/2008 | Kaneko et al. | 358/1.9 |
| 2009/0010536 | A1 | 1/2009 | Mizukami | |
| 2009/0179930 | A1 * | 7/2009 | Morgan et al. | 347/9 |
| 2010/0225939 | A1 * | 9/2010 | Gil et al. | 358/1.9 |

FOREIGN PATENT DOCUMENTS

| JP | 2004-025785 A | 1/2004 |
|---|---|---|
| JP | 2004-214724 | 7/2004 |
| JP | 2004-214724 A | 7/2004 |
| JP | 2005-212270 A | 8/2005 |
| JP | 2006-209751 A | 8/2006 |
| JP | 2008-160306 A | 7/2008 |
| JP | 2009-017089 | 1/2009 |
| JP | 2009-027468 A | 2/2009 |
| JP | 2011066711 * | 3/2012 |

\* cited by examiner

*Primary Examiner* — Jerome Grant, II (57) ABSTRACT

An image processing device, an image processing method, and a program enable easily acquiring for each profile information related to the amount of ink that is required to record image data after the image data is converted using a particular profile. A host computer 1 transforms reference image data 27 based on an ICC profile 23 for transforming image data to image data in a different color space, and outputs transformed reference image data 28. Based on a lookup table 25 for transforming the coordinate values of a color space to ink volume information in an ink color space rendered by plural different types of ink, the transformed reference image data 28 is converted to ink volume information, and based on this ink volume information and the reference image data 27 before the transformation, ink information correlating the ink volume information to the colors contained in the reference image data 27 before transformation is produced.

9 Claims, 6 Drawing Sheets

IMAGE PROCESSING DEVICE, IMAGE PROCESSING METHOD, AND PROGRAM

CROSS-REFERENCE TO RELATED APPLICATIONS

Japanese Patent application No. 2009-075823 is hereby incorporated by reference in its entirety.

BACKGROUND

1. Field of Invention

The present invention relates to an image processing device, an image processing method, and a program.

2. Description of Related Art

A color management system is commonly applied to recording devices such as inkjet printers to convert image data for an image to be recorded by using a profile (such as an International Color Consortium (ICC) profile) that is color matched to the recording device. The profile used for this transformation is a reference profile that is produced by the manufacturer of the recording device based on the color reproduction characteristics of the recording device. The user can also create custom profiles by, for example, using profile creation software for creating such profiles. The user may, for example, create different profiles to match the characteristics of the paper used as the recording medium, or to suppress ink consumption. See, for example, Japanese Unexamined Patent Appl. Pub. JP-A-2009-17089.

However, in an effort to reduce ink consumption when recording image data, the user may also manually adjust the image or select and use an image that can be printed using less ink, but when the image that has been thus adjusted or selected is then transformed using the selected profile, the colors may change and the amount of ink that is actually used is not necessarily reduced. More particularly, how ink consumption will change when the image data is transformed using a color management profile has been unknowable without actually using the profile to transform the image

SUMMARY OF INVENTION

An image processing device, an image processing method, and a program according to the present invention enable easily acquiring for each profile information related to the amount of ink that is required to record the image data after the image data is transformed using a particular profile.

An image processing device according to a first aspect of the invention has a storage unit that stores a profile for transforming input image data to output image data in a different color space, and a lookup table for transforming a coordinate value in the color space of the image data to an ink volume in an ink color space rendered by plural different types of ink; a profile transformation unit that outputs transformed reference image data by transforming reference image data containing a plurality of colors based on said profile; and an ink information generating unit that transforms the transformed reference image data output by the profile transformation unit to ink volume information based on the lookup table, and based on said ink volume information and the reference image data before transformation by the profile transformation unit generates ink information correlating said ink volumes with the colors contained in the reference image data before transformation.

Because ink information that correlates ink volumes with the colors contained in the reference image data before transformation is produced, this aspect of the invention can determine for each color contained in the reference image data before transformation how much ink is required to print the image data when image data of those colors is converted according to the profile. As a result, because the amount of ink that would be required if the profile transformation was performed can be determined without actually performing the profile transformation if this ink information is used, information about the amount of ink that would be required if the image data was transformed using the selected profile can be easily acquired without actually applying the image data profile transformation.

In an image processing device according to another aspect of the invention the ink information generating unit correlates ink volume information to the colors contained in the reference image data based on the color of each area in the reference image data, the correlation between areas in the reference image data and areas in the transformed reference image data, and the correlation between the areas in the transformed reference image data and the ink volume.

This aspect of the invention can easily and accurately produce ink information that correlates the colors in the reference image data before transformation with the ink volume information based on the transformed reference image data.

In an image processing device according to another aspect of the invention the ink information generating unit produces ink information correlating the colors contained in the reference image data before transformation with an ink shot count for each type of ink.

Because this aspect of the invention can predict the ink shot count for each type of ink as though the profile transformation had been applied but without actually applying the profile transformation, more detailed information, such as the time required to record the image data, can be acquired.

An image processing device according to another aspect of the invention further preferably has an ink volume prediction unit that predicts ink volume information for the image data after transformation when the input image data is transformed according to said profile based on the ink information produced by the ink information generating unit.

By actually predicting the amount of ink required to print the input image data when image data is input, an image that consumes less ink can be selected or the image can be corrected to consume less ink, for example.

An image processing device according to another aspect of the invention further preferably has an image correction unit that corrects the input image data based on the ink volume predicted by the ink volume prediction unit and a set ink volume target value.

By actually predicting the ink volume required to print the input image data when image data is input and correcting the image to conform to a set ink volume target value, this aspect of the invention can easily acquire image data with the desired ink volume.

Another aspect of the invention is an image processing method including steps of transforming reference image data containing a plurality of colors based on a profile for transforming image data to image data in a different color space, and outputting the transformed reference image data; and converting the transformed reference image data to ink volume information based on a lookup table for transforming the coordinate values of a color space to ink volume information in an ink color space rendered by plural different types of ink, and generating ink information that correlates an ink volume to a color contained in the reference image data before transformation based on said ink volume information and the reference image data before transformation.

Because ink information that correlates ink volumes with the colors contained in the reference image data before transformation is produced, this aspect of the invention can determine for each color contained in the reference image data before transformation how much ink is required to print the image data when image data of those colors is converted according to the profile. As a result, information about the amount of ink that would be required if the image data was transformed using the selected profile can be easily acquired without actually applying the image data profile transformation.

Another aspect of the invention is a program that causes a computer to function as a profile transformation unit that transforms reference image data containing a plurality of colors based on a profile for transforming image data to a different color space, and outputs transformed reference image data; and an ink information generating unit that transforms the transformed reference image data to ink volume information based on a lookup table for transforming the coordinate values of a color space to ink volume information in an ink color space rendered by plural different types of ink, and generating ink information that correlates ink volumes to colors contained in the reference image data before transformation based on said ink volume information and the reference image data before transformation.

If this program is executed by a computer, ink information that correlates ink volumes with the colors contained in the reference image data before transformation is produced, and how much ink is required to print the image data when image data of those colors is converted according to the profile can be determined for each color contained in the reference image data before transformation. As a result, information about the amount of ink that would be required if the image data was transformed using the selected profile can be easily acquired without actually applying the image data profile transformation.

Another aspect of the invention is an information recording medium that stores the program of the invention. Examples of such information recording media include magnetic recording media such as floppy disks and hard disk drives; magneto-optical recording media such as MO discs; optical recording media such as CD-R, CD-RW, DVD±R, DVD±RW, and DVD-RAM media; recording devices that use semiconductor storage devices; and other types of recording media. The program can be provided on such recording media in a format that can read by computer.

EFFECT OF THE INVENTION

The invention enables easily acquiring information related to the amount of ink that is required when a particular profile is used to transform image data without actually using the profile to transforming the image data.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Figure 1:
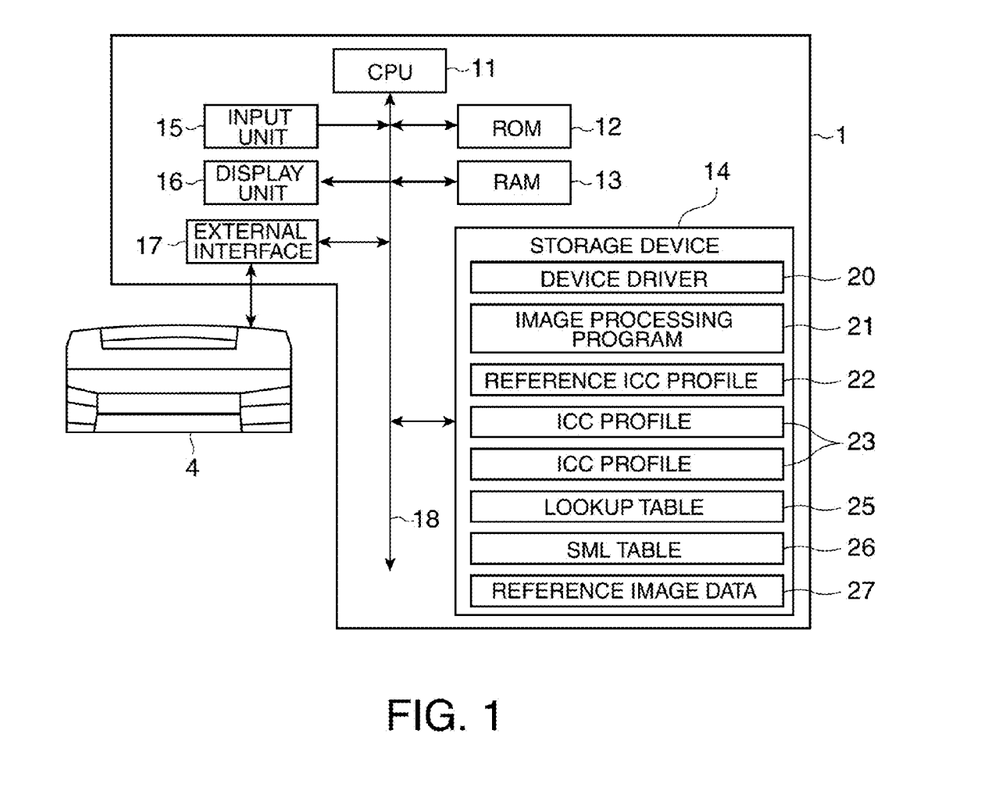
FIG. 1 is a block diagram showing the configuration of a host computer in a preferred embodiment of the invention.

FIG. 1 is a block diagram showing the configuration of a host computer 1 as an image processing device according to a preferred embodiment of the invention.

As shown in FIG. 1, the host computer 1 has a CPU 11 that executes a basic control program stored in ROM 12 to control the other parts of the host computer 1, ROM 12 that stores the basic control program, for example, that is executed by the CPU 11, RAM 13 that temporarily stores processed data and programs executed by the CPU 11, a storage device 14 (storage unit) that stores programs and data, an input unit 15 connected to an input device such as a keyboard or pointing device, a display unit 16 that controls displaying data on a display device (not shown in the figure), an external interface 17 for connecting external peripherals to the host computer 1, and a bus 18 to which these various components are connected.

The CPU 11 reads and executes the basic control program stored in ROM 12 when the host computer 1 power is turned on, and initializes other parts of the host computer 1. Based on data input from the input unit 15, for example, the CPU 11 then reads and executes a program such as a device driver 20 or image processing program 21 stored in the storage device 14, and controls the operation of other parts of the host computer 1.

Based, for example, on data input from the input unit 15 while executing the image processing program 21, the CPU 11 reads and processes data such as the reference ICC profile 22, ICC profile 23, lookup table (LUT) 25, SML table 26, and reference image data 27 from the storage device 14.

The storage device 14 is rendered by means of a magnetic or optical recording medium or semiconductor storage device, and non-volatilely stores programs and data. The storage device 14 stores the device driver 20 and image processing program 21 executed by the CPU 11, and the reference ICC profile 22, ICC profile 23, lookup table 25, SML table 26, and reference image data 27 that are processed when the image processing program 21 is executed.

The device driver 20 is a program enabling the host computer 1 to control a printer 4. When the type and size of the paper used as the recording medium for printing operations by the printer 4 are specified by operations passed through the input unit 15, the device driver 20 generates control information for passing the input content (print settings) to the printer 4, and sends the control information to the printer 4. The device driver 20 contains information related to the data format and command types sent through the external interface 17 to the printer 4.

The image processing program 21 is a program executed by the CPU 11, and realizes the functions of a first profile conversion unit 31, second profile conversion unit 32, and ink information generating unit 33 by means of the image process described below.

The reference ICC profile 22 and ICC profiles 23 are profiles for ICC (International Color Consortium) color management for printer using the printer 4.

The reference ICC profile 22 is preset in the host computer 1 to which the printer 4 is connected as the profile to be used for printing images on the printer 4. The reference ICC profile 22 is a profile that is produced and distributed by, for example, the manufacturer of the printer 4 to match the color reproduction characteristics of the printer 4. The reference ICC profile 22 is used to transform the color space of the image data that is to be printed by the printer 4 so that the image data to be printed can be displayed on a display screen by means of the display unit 16 to match the color reproduction characteristics of the printer 4.

The storage device 14 also stores a plurality of ICC profiles 23 (profiles). The ICC profiles 23 are profiles that are produced by the user or produced and distributed by a third party. The user can freely select and use these profiles in order to process the image data according to the characteristics of the paper used as the recording medium or the type of image data, for example.

In this embodiment of the invention the reference ICC profile 22 and ICC profiles 23 include an AtoBxTAG profile for transformations from the RGB color space to the L*a*b* color space, and a BtoAxTAG profile for transformations from the L*a*b* color space to the RGB color space, but profiles for transformations to other color spaces may be used.

The lookup table 25 (LUT) is a table for determining the amount of ink used to form the dots of the image data when printing the image data on the printer 4. This table is predefined according to the color reproduction characteristics of the printer 4 and the characteristics of the ink used by the printer 4.

More specifically, the lookup table 25 is used to determined how much ink of each color of CMYK ink that is used in the printer 4 is required to form each of the dots in image data defined in the RGB color space, and is a table configured for transforming RGB data to CMYK data.

The SML table 26 is a table for determining the size of each ink droplet when the printer 4 discharges each color of CMYK ink. After the amount of ink of each color is determined using the lookup table 25, the SML table 26 is used to determine the size of each ink droplet that is required to form each dot of the image data in the RGB color space. In this embodiment of the invention the size of each ink droplet is set to one of the three levels S, M, and L, but more levels may be used. The specific values in the SML table 26 are set according to the ink characteristics and the nozzle configuration of the print head (not shown in the figure) of the printer 4.

Note that the lookup table 25, the SML table 26, and the reference ICC profile 22 are optimized for the printer 4.

The reference image data 27 stored by the storage device 14 is image data containing the full gamut of the corresponding color space, which in this embodiment of the invention is the RGB color space.

An input device such as a keyboard and a pointing device such as a mouse or pen tablet is connected to the input unit 15. The input unit 15 detects operation of these input devices, and outputs data corresponding to the detected operation to the CPU 11.

A display device (not shown in the figure) such as a LCD panel is connected to the display unit 16. The display unit 16 outputs the process result from the CPU 11 to the display device. For example, in the image transformation process described below the display unit 16 displays the image data being processed and the image data resulting from the transform on the display device.

The external interface 17 includes a connector conforming to a particular standard such as USB or IEEE 1284 or an antenna for wireless communication, and an interface circuit appropriate to the connector or antenna. The external interface 17 is connected by wire or wirelessly to an external peripheral of the host computer 1, and enables communication between the host computer 1 and the peripheral devices.

The printer 4 is connected to the external interface 17 in this embodiment of the invention. The printer 4 is an inkjet printer that prints (records or forms) images by discharging four colors of ink, cyan (C), magenta (M), yellow (Y), and black (K), onto the recording surface of the recording medium, which may be a cut-sheet or continuous recording medium.

The host computer 1 controls the printer 4 as a result of the CPU 11 executing the device driver 20, and causes the printer 4 to print an image. The host computer 1 also executes the image processing program 21 to execute a process that calculates how much ink is used by the printer 4 to print the image data.

Figure 2:
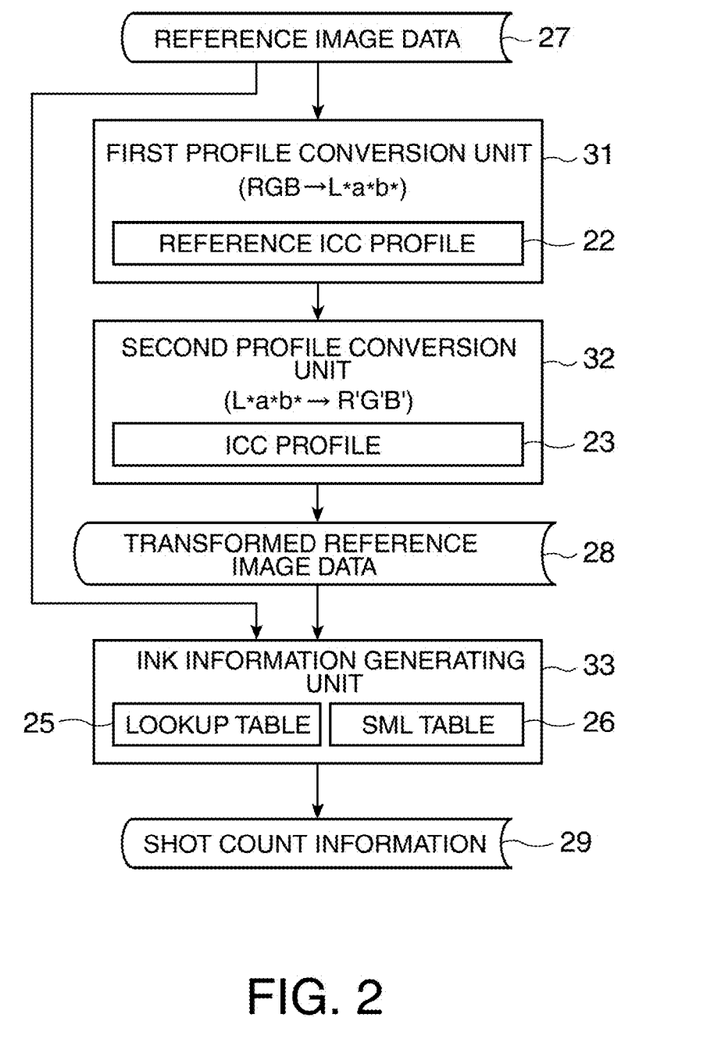
FIG. 2 describes the basic image processing operation of the host computer.

FIG. 2 describes the basic image processing operation of the host computer 1.

When one of the plural ICC profiles 23 stored in the storage device 14 is selected by the host computer 1, the image process shown in FIG. 2 determines ink consumption when the image data is transformed using the selected ICC profile 23. The function units labeled the first profile conversion unit 31, the second profile conversion unit 32, and the ink information generating unit 33 in FIG. 2 are rendered virtually using the resources of the CPU 11 and the RAM 13 when the CPU 11 executes the image processing program.

In the image process shown in FIG. 2, the first profile conversion unit 31 reads the reference image data 27 stored in storage device 14, and transforms the image data from the RGB color space to the L*a*b* color space using the reference ICC profile 22. The transformed image data is then transformed by the second profile conversion unit 32 from the L*a*b* color space to the RGB color space using the ICC profile 23. Note that the ICC profile 23 used here is the ICC profile 23 selected by the user operating the input unit 15 from among the plural ICC profiles 23 stored in the storage device 14. This second profile conversion unit 32 outputs transformed reference image data 28 in the RGB color space.

Using the lookup table 25 and the SML table 26, the ink information generating unit 33 then calculates the number of ink shots required to print each dot of the transformed reference image data 28. More specifically, the RGB data for each dot in the transformed reference image data 28 is converted to an ink volume by the lookup table 25, and the number of ink droplets that must be discharged to form each dot, that is, the shot count, is determined based on the ink volume and the size of each ink droplet determined by the SML table 26. Note that because the image is not actually printed at this time, the resulting shot count is an estimate.

The ink information generating unit 33 then correlates each dot in the original reference image data 27 with the ink shot count of each color by comparing the correlation between the RGB data and shot count of each dot in the transformed reference image data 28 with the reference image data 27. More specifically, the ink information generating unit 33 acquires the pre-transformation color of each dot in the transformed reference image data 28 based on the reference image data 27, and relates these colors to the ink shot count of each dot in the transformed reference image data 28 to correlate the ink shot counts with the colors in the reference image data 27. Because the reference image data 27 covers the full color gamut, the ink information generating unit 33 can produce shot count information 29 (ink information) that correlates each color to the ink shot count after transformation by the ICC profile 23 across the full color gamut.

Furthermore, because the shot count information 29 is information correlating colors and ink shot counts, the ink volume can be calculated from the ink shot counts. In other words, the shot count information 29 is information that correlates each color to the amount of ink after transformation using the ICC profile 23.

Figure 3:
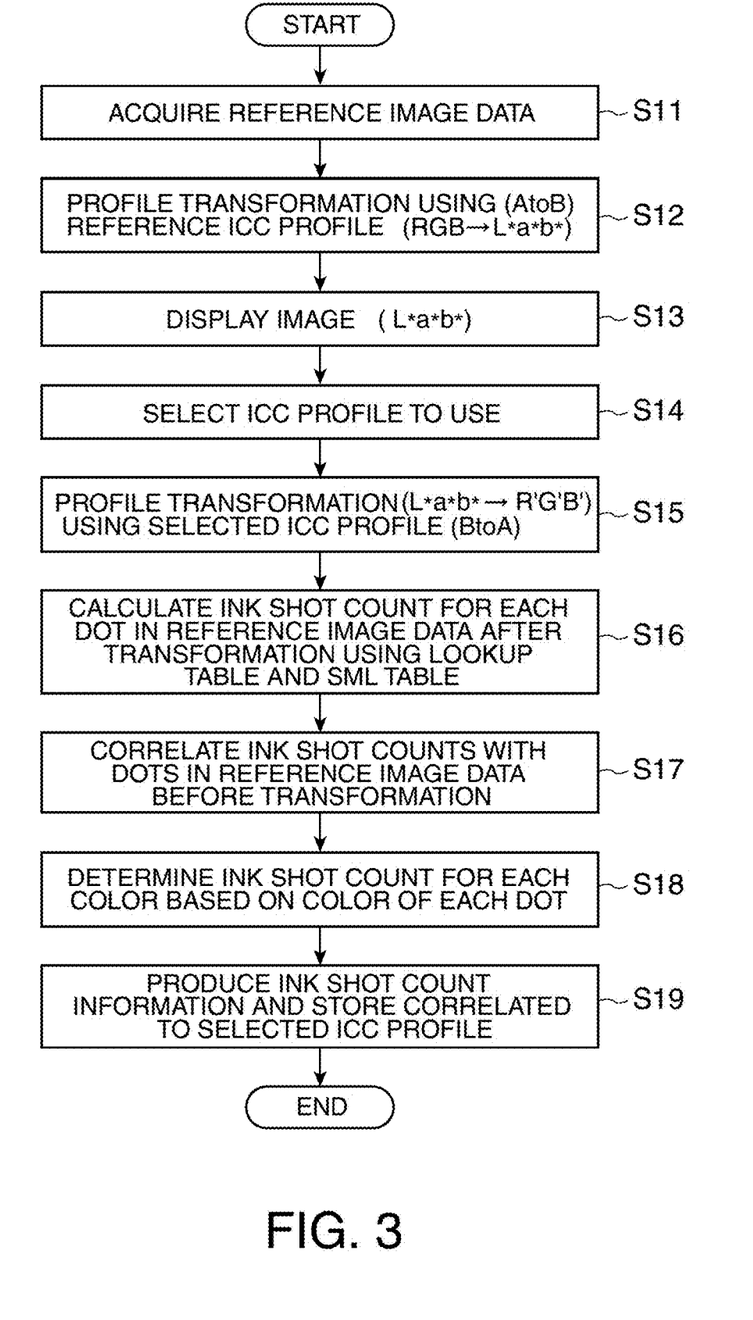
FIG. 3 is a flow chart of the image process executed by the host computer.

FIG. 3 is a flow chart describing the operation of the host computer 1.

The operation shown in FIG. 3 is achieved by the CPU 11 executing the image processing program 21.

The CPU 11 first reads the reference image data 27 from the storage device 14 (step S11), transforms the reference image data 27 in the RGB color space to a device-independent color space, such as the L*a*b* color space, by means of the reference ICC profile 22 (step S12), and displays the result on the display screen by means of the display unit 16 (step S13). The full gamut of colors that can be recorded by the printer 4 are displayed on the display screen as a result of this process.

Figure 4:
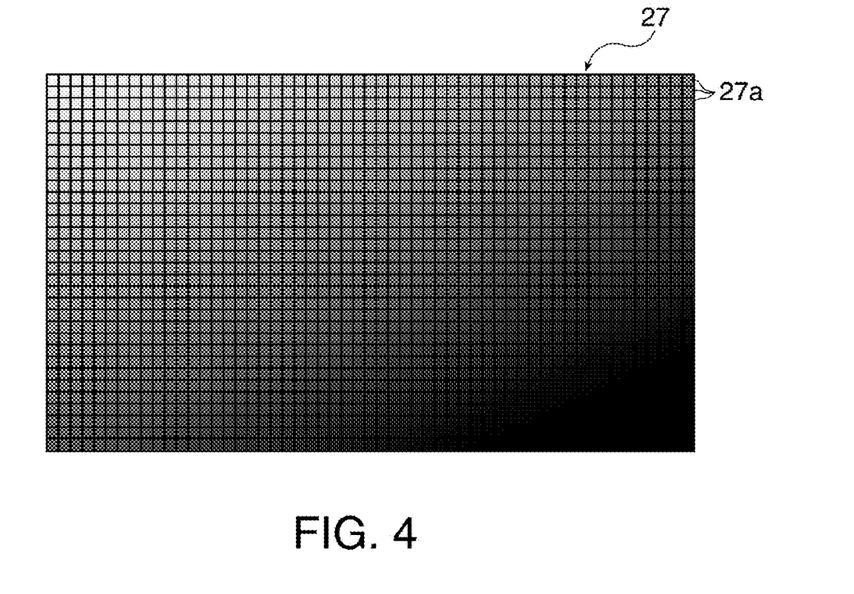
FIG. 4 shows an example of the configuration of the reference image data.

FIG. 4 shows a specific example of the reference image data 27.

The reference image data 27 is image data including the full color gamut as described above, and in this embodiment of the invention is RGB display color data. The reference image data 27 shown by way of example in FIG. 4 is composed of dots (pixels) 27a as a plurality of areas arranged in a matrix, each dot 27a is shaded a different color, and the overall reference image data 27 has every color in the RGB color space assigned to a dot 27a. If the number of dots 27a in the reference image data 27 does not match the number of colors, a number of dots 27a may be assigned the same color.

Referring again to FIG. 3, the ICC profile 23 to be applied is selected from among the plural ICC profiles 23 stored in the storage device 14 by the user operating the input unit 15 (step S14). The CPU 11 then transforms the reference image data 27 that was transformed to a device-independent color space in step S12 to the RGB color space based on the selected ICC profile 23 (step S15). The data resulting from this transform is the transformed reference image data 28.

For example, the colors red, green, and blue (R, G, B) contained in the reference image data 27 are transformed in step S12 to L*a*b* colors, and are then transformed to (R', G', B') colors in step S15.

Next, based on the lookup table 25 and SML table 26, the CPU 11 calculates the ink shot count for each color of ink for each dot in the transformed reference image data 28 (step S16).

The CPU 11 also reads the reference image data 27 from the storage device 14, and correlates each dot (dot 27a) in the reference image data 27 to the ink shot counts calculated in step S16 (step S17).

Next, the CPU 11 acquires the color value of each dot in the reference image data 27, identifies the ink shot count corresponding to each acquired color (step S18), and produces shot count information 29 containing the ink shot count of each identified color.

The CPU 11 then stores the shot count information 29 in the storage device 14 correlated to the ICC profile 23 selected in step S14 (step S19), and this process then ends.

Shot count information 29 is thus produced for the one selected ICC profile 23 by the image processing operation described above, and the ink shot counts are correlated to the colors resulting from transformation using the selected ICC profile 23 by means of the shot count information 29. Therefore, when desired image data is transformed using a ICC profile 23, the ink shot count required to print that image data on the printer 4 can be estimated based on the shot count information 29.

The shot count information 29 is acquired based on the reference image data 27 through a process involving a transformation based on the reference ICC profile 22, a transformation based on the ICC profile 23, and calculation of the ink shot count based on the lookup table 25 and SML table 26. As a result, the shot count information 29 is affected not only by the ICC profile 23, but also by the reference ICC profile 22, the lookup table 25, and the SML table 26. The lookup table 25 and SML table 26 contain data that is prepared together with the reference ICC profile 22 to match the printer 4, and are always used when printing using the printer 4. The reference ICC profile 22 is for transforming the reference image data 27 to a device-independent color space according to the device characteristics of the printer 4. When the host computer 1 is assumed to print using the printer 4, the host computer 1 must use the reference ICC profile 22, the lookup table 25, and the SML table 26. As a result, if the shot count information 29 is used, the ink shot count required to print the desired image data using the printer 4 can be reliably predicted.

As described above, a host computer 1 according to this embodiment of the invention has a storage device 14 that stores a plurality of ICC profiles 23 for transforming input image data to output image data in a different color space; a lookup table 25 for transforming the coordinates of the color space in which the image data is rendered to the ink volume values of the ink color space rendered by plural different inks; and an SML table 26.

The CPU 11 also renders a second profile conversion unit 32 and an ink information generating unit 33. The second profile conversion unit 32 outputs transformed reference image data 28 by transforming the reference image data 27 containing a plurality of colors based on a selected ICC profile 23. The ink information generating unit 33 transforms the transformed reference image data 28 output by the second profile conversion unit 32 to ink shot counts based on the lookup table 25 and the SML table 26, and based on these ink shot counts and the pre-transformation reference image data 27, generates shot count information 29 correlating the ink shot counts to the colors contained in the pre-transformation reference image data 27.

As a result, the amount of ink and the number of ink shots that are required to print each color contained in the reference image data 27 can therefore be acquired when the image data for each color is transformed using the selected ICC profile 23. As a result, because the required amount of ink can be determined as though the ICC profile 23 transformation was performed if this shot count information 29 is used but without actually executing the ICC profile 23 transformation, information about the amount of ink that is required when the image data is transformed using a selected profile can be easily acquired without applying the profile transformation to the image data. Furthermore, because the shot count information 29 is stored in the storage device 14 correlated to the ICC profile 23, information about the ink shot count when the image data is transformed using an ICC profile 23 can be acquired for each of a plurality of ICC profiles 23, and the ink shot counts required with the plural different ICC profiles 23 can be compared.

The reference image data 27 contains a plurality of dots 27a of different colors, and the CPU 11 that functions as the ink information generating unit 33 correlates the colors contained in the reference image data 27 with the ink volume information based on the colors of the dots 27a in the reference image data 27, the correlation between the dots 27a in the reference image data 27 and the dots in the transformed reference image data 28, and the correlation between the dots in the transformed reference image data 28 and the ink volume information. As a result, the ink shot counts can be easily and accurately correlated to the color of each dot 27a in the reference image data 27, and the shot count information 29 can be generated.

In addition, because the CPU 11 functions as an ink information generating unit 33, and generates ink information correlating the colors contained in pre-transformation reference image data 27 with the ink shot count of each color of ink, more detailed information related to recording images after profile transformation can be obtained than just the ink volume information.

Using the shot count information 29 produced as described above, the host computer 1 can execute other image processes such as described below.

Figure 5:
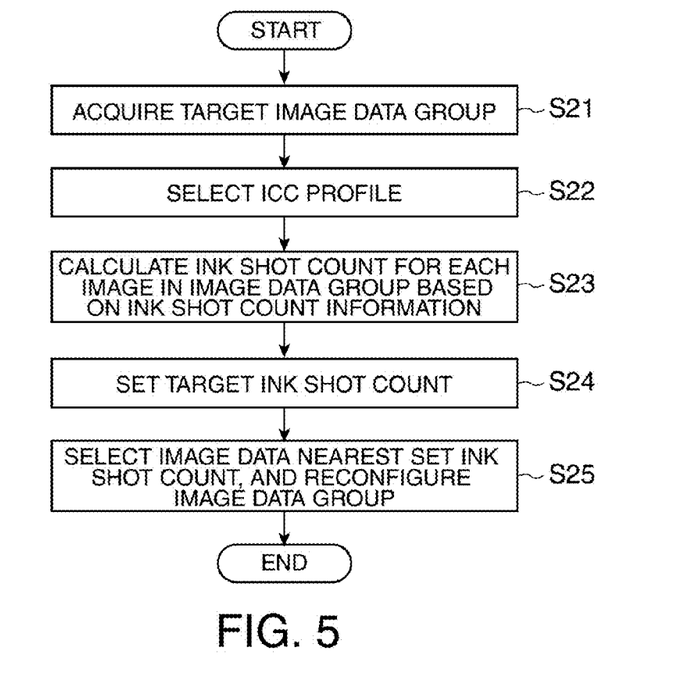
FIG. 5 is a flow chart showing an example of an image process using shot count information.

FIG. 5 is a flow chart of one image process that can be executed using the shot count information 29. The process shown in FIG. 5 is executed by the CPU 11 running the image processing program 21.

The process shown in FIG. 5 selects a plurality of images (image data) requiring a smaller ink shot count from an image data group containing image data for numerous images.

First, the desired image data group is selected by operations detected through the input unit 15. The CPU 11 then acquires the selected image data group from the storage device 14 (step S21). The desired ICC profile 23 is then selected by operations detected through the input unit 15 (step S22).

The CPU 11 reads the shot count information 29 stored in the storage device 14 correlated to the selected ICC profile 23, and based on this shot count information 29 calculates the ink shot count for all images (image data) in the image data group (step S23). In step S23 the CPU 11 functions as an ink volume prediction unit.

The target ink shot count is then set by operations detected through the input unit 15 (step S24). Based on the ink shot counts for the image data obtained in step S23, the CPU 11 selects the image data that is closest to the set ink shot count, reconfigures the image data group using the selected image data (step S25), and the process then ends.

The process shown in FIG. 5 can thus automatically select the image data closest to the ink shot count set as the target ink shot count from among a large number of images (image data).

Figure 6:
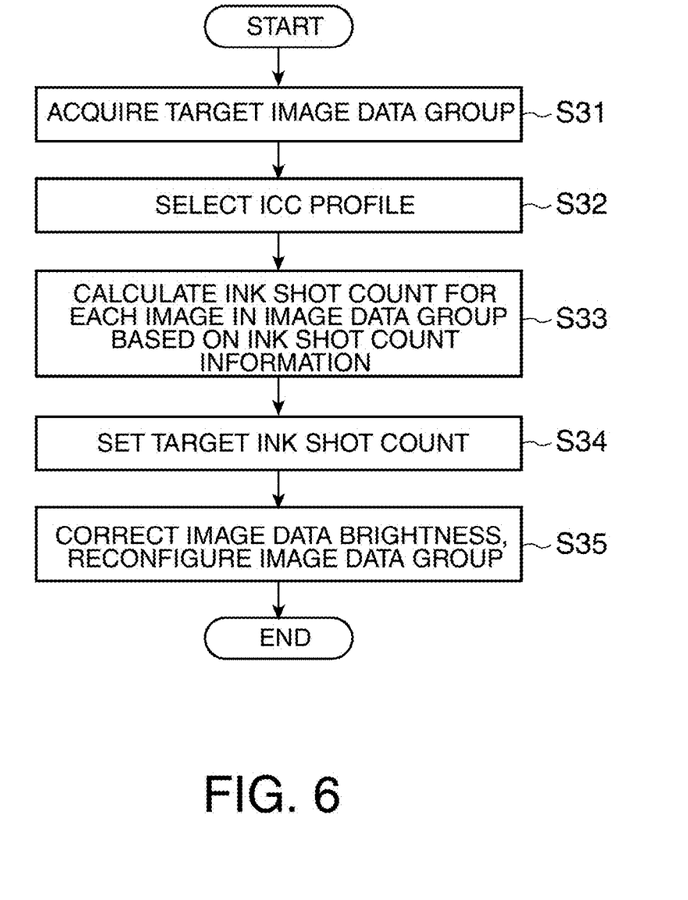
FIG. 6 is a flow chart of another example of an image process using shot count information

FIG. 6 is a flow chart of another image process that uses the shot count information 29. The process shown in FIG. 6 is executed by the CPU 11 running the image processing program 21.

The process shown in FIG. 6 corrects the target image data so that the ink shot count becomes closer to the target ink shot count.

First, the desired image data group is selected by operations detected through the input unit 15. The CPU 11 then acquires the selected image data group from the storage device 14 (step S31). The desired ICC profile 23 is then selected by operations detected through the input unit 15 (step S32).

The CPU 11 then reads the shot count information 29 stored in the storage device 14 correlated to the selected ICC profile 23, and based on this shot count information 29 calculates the ink shot count for all images (image data) in the image data group (step S33). In step S33 the CPU 11 functions as an ink volume prediction unit.

The target ink shot count is then set by operations detected through the input unit 15 (step S34). The ink shot count set in this step S34 is the ink shot count for each color used by the printer 4.

The CPU 11 then compares the ink shot counts for the image data acquired in step S33 with the target ink shot count set in step S34, and corrects the brightness of the image data for each image so that the ink shot count becomes closer to the target ink shot count (step S35). In this step S35 the CPU 11 functions as an image correction unit.

More specifically, the CPU 11 determines the ink shot count for each color in the image data for one of the group of images in step S33, and in step S34 compares this ink shot count with the target ink shot count. The color of ink with an ink shot count that differs the most from the target ink shot count is then identified, and the image data correction content (such as the color correcting the brightness, or the amount of brightness correction) is then determined so that the ink shot count of this ink color becomes closer to the target ink shot count. A correlation between the ink shot count and the image data color (RGB value) before processing is contained in the shot count information 29. As a result, if the ink shot count of yellow (Y) is to be decreased, for example, how much the brightness of what color should be increased or decreased can be determined. So that the brightness correction is not extreme, the brightness of multiple colors is preferably corrected uniformly. Based on the colors contained in the target image data, the ink shot counts of those colors, and the ink shot counts when the brightness of these colors is corrected, the CPU 11 determines the colors for which the brightness is to be corrected, and the amount of correction or the color resulting from the correction. The image data in the image data group is then corrected in step S35, and this process ends.

The process shown in FIG. 6 can adjust the ink shot counts of multiple images to an ink shot count closer to the target ink shot count.

Figure 7:
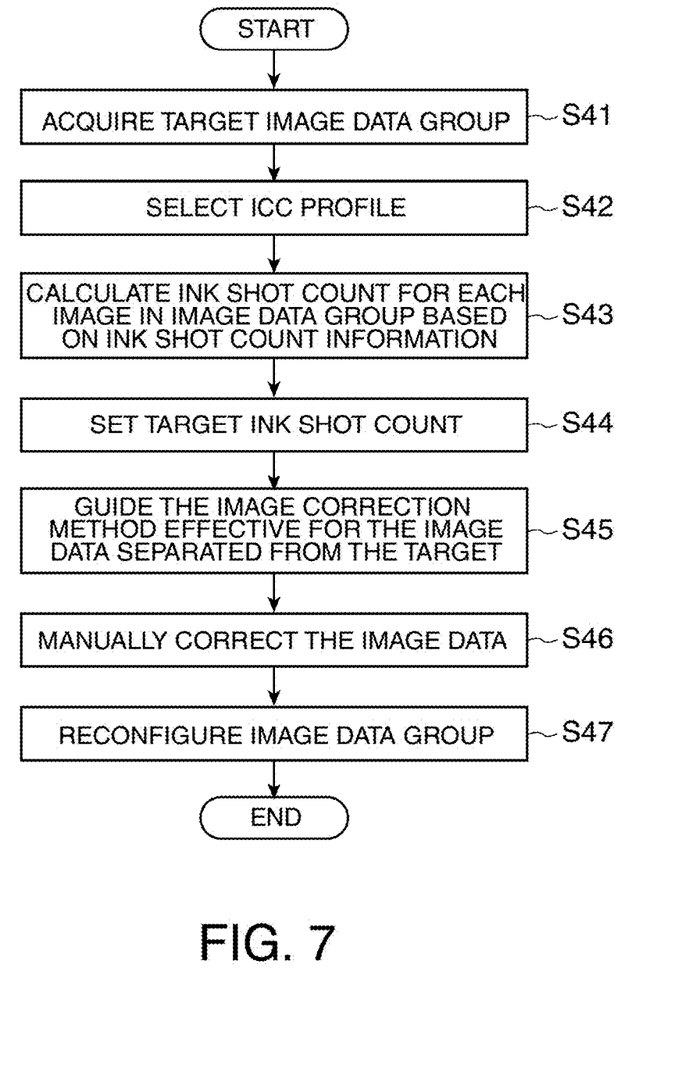
FIG. 7 is a flow chart of still another example of an image process using shot count information.

FIG. 7 is a flow chart of yet another image process that uses the shot count information 29. The process shown in FIG. 6 is executed by the CPU 11 running the image processing program 21.

The process shown in FIG. 7 guides the user through the correction method enabling the user to manually correct the ink shot count of the target image data to approach the target ink shot count.

First, the desired image data group is selected by operations detected through the input unit 15. The CPU 11 then acquires the selected image data group from the storage device 14 (step S41). The desired ICC profile 23 is then selected by operations detected through the input unit 15 (step S42).

The CPU 11 then reads the shot count information 29 stored in the storage device 14 correlated to the selected ICC profile 23, and based on this shot count information 29 calculates the ink shot count for all images (image data) in the image data group (step S43). In step S43 the CPU 11 functions as an ink volume prediction unit.

The target ink shot count is then set by operations detected through the input unit 15 (step S44). The ink shot count set in this step S34 is the ink shot count for each color used by the printer 4.

The CPU 11 compares the ink shot counts for the image data obtained in step S43 with the target ink shot count set in step S44, and guides the method of correcting the image data for which the difference between the ink shot count and the target ink shot count is particularly great so that the ink shot count becomes closer to the target ink shot count (step S45).

More specifically, the CPU 11 determines the ink shot count of each color in step S43 for the image data for one of the images in the group, compares this ink shot count with the target ink shot count set in step S44, ranks the image data for each image sequentially by the greatest difference from the target ink shot count, and continues the rest of the process in this sequence.

The CPU 11 then identifies the color of ink in the target image data for which the ink shot count difference is greatest, determines the correction content of the image data (such as the color of which the brightness is corrected or how much the brightness is corrected) so that the ink shot count of this color approaches the target ink shot count, temporarily stores this content linked to the image data, and repeats this process for all images (image data) in the image data group. The CPU 11 then displays the image data together with text or images guiding the correction method corresponding to each image (image data) on the display screen by means of the display unit 16.

The image data is then manually corrected through the input unit 15, and the corrected image data is stored in the storage device 14 (step S46). The CPU 11 reconstructs the target image data group using the corrected image data (step S47), and the process then ends.

The process shown in FIG. 7 enables manually correcting the image data so that the ink shot counts of multiple images (image data) approach an ink shot count set as a target value. In addition, because guidance is provided for a method of effectively correcting the image data, the user can easily and reliably adjust the ink shot count to the target value while manually correcting the image according to the user's intent.

It will be obvious to one with ordinary skill in the related art that the foregoing embodiment is only one example of the invention, and can be modified and improved in various ways without departing from the scope of the accompanying claims.

For example, the foregoing embodiment transforms a reference image data 27 from the RGB color space to the L*a*b* color space using a reference ICC profile 22, then transforms the transformed image data back to the RGB color space using a ICC profile 23 to generate transformed reference image data 28, and then produces the shot count information 29 using this transformed reference image data 28, a lookup table 25, and a SML table 26. The invention is not so limited, however. For example, if the lookup table 25 is a table for converting coordinate values in the L*a*b* color space to ink volume values, the reference image data 27 may be transformed using an ICC profile 23 to acquire the transformed reference image data 28 without a first transformation using the reference ICC profile 22.

In addition, an image having dots covering the full color gamut is described as an example of the reference image data 27 in the foregoing embodiment, but the reference image data 27 may be configured as desired. For example, the reference image data 27 may be an image that covers the full gamut of colors that can be displayed by the display device connected to the display unit 16, an image that covers the full gamut of colors that can be printed by the printer 4, or an image that covers the full gamut of colors in a predefined range.

Yet further, the host computer 1 to which the printer 4 is connected is described in the foregoing embodiment as executing the image processing program 21 and executing a process that produces the shot count information 29. The invention is not so limited, however. For example, a host computer to which the printer 4 is not connected may produce the shot count information 29, send the resulting shot count information 29 to another computer over a communication connection, and the computer that receives this shot count information 29 may print using the printer 4 or may simply predict the ink shot count when printing using the printer 4.

Yet further, an inkjet printer 4 that forms images using the four ink colors cyan (C), yellow (Y), magenta (M), and black (K) is described in the foregoing embodiment, but the number and type of inks that are used can be determined as desired. More particularly, the invention can also be used with printers that print using six or more colors of ink, and can be used with printers that print using fewer colors or types of ink. The invention can also be used with printers that sublimate and bond the ink to the recording medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image processing device comprising:
a storage unit that stores a profile for transforming image data from one color space to another color space, and a lookup table for transforming coordinate values in a color space of the image data to ink volumes in an ink color space rendered by plural different types of ink;
a profile transformation unit that transforms input reference image data containing a plurality of colors to transformed reference image data based on said profile; and
an ink information generating unit that transforms the transformed reference image data to ink volume information based on the lookup table, and based on said ink volume information and the input reference image data, generates ink information correlating said ink volumes with the colors contained in the input reference image data;
wherein the ink information generating unit correlates ink volume information to the colors contained in the input reference image data based on the color of each area in the input reference image data, the correlation between areas in the reference image data and areas in the transformed reference image data, and the correlation between the areas in the transformed reference image data and the ink volumes.

2. The image processing device described in claim 1, wherein:
the ink information generating unit produces ink information correlating the colors contained in the input reference image data with an ink shot count for each type of ink.

3. The image processing device described in claim 1, further comprising:
an ink volume prediction unit that predicts ink volume information for the transformed image data based on the ink information produced by the ink information generating unit.

4. The image processing device described in claim 3, further comprising:
an image correction unit that corrects the pre-transformed image data based on the ink volume predicted by the ink volume prediction unit and a set ink volume target value.

5. An image processing method comprising steps of:
transforming input reference image data containing a plurality of colors to transformed reference data based on a profile for transforming image data from one color space to another color space;
converting the transformed reference image data to ink volume information based on a lookup table for transforming coordinate values of a color space to ink volume information in an ink color space rendered by plural different types of ink; and
generating ink information that correlates ink volumes to colors contained in the input reference image data based on said ink volume information and the input reference image data; wherein
the input reference image data has a plurality of areas of different colors; and
the ink information is generated by correlating ink volume information to the colors contained in the input reference image data based on the color of each area in the ingut reference image data correlation between areas in the input reference image data and areas in the transformed reference image data, and the correlation between the areas in the transformed reference image data and the ink volumes.

6. The image processing method described in claim 5, wherein:
the ink information is generated by correlating the colors contained in the input reference image data with an ink shot count for each type of ink.

7. The image processing method described in claim 5, further comprising a step of:
predicting ink volume information for the transformed image data based on the produced ink information.

8. The image processing method described in claim 7, further comprising a step of:
correcting the pre-transformed image data based on the predicted ink volume and a set ink volume target value.

9. A non-transitory computer-readable medium storing a program that causes a computer to execute the image processing method described in claim 5.

* * * * *